US011503811B2

(12) United States Patent
Greive et al.

(10) Patent No.: US 11,503,811 B2
(45) Date of Patent: Nov. 22, 2022

(54) SEMIRIGID POULTRY AND/OR SWINE ENCLOSURE

(71) Applicant: Perdue Farms, Inc., Salisbury, MD (US)

(72) Inventors: Raymond Paul Greive, Murrieta, CA (US); Jeffrey Lane McDaniel, Murrieta, CA (US); Daniel J. Coady, Warner Springs, CA (US)

(73) Assignee: Perdue Foods LLC, Salisbury, MD (US)

( * ) Notice: Subject to any disclaimer, the term of this patent is extended or adjusted under 35 U.S.C. 154(b) by 0 days.

(21) Appl. No.: 17/017,609

(22) Filed: Sep. 10, 2020

(65) Prior Publication Data

US 2021/0068373 A1 Mar. 11, 2021

Related U.S. Application Data

(60) Provisional application No. 62/898,512, filed on Sep. 10, 2019.

(51) Int. Cl.
*A01K 31/00* (2006.01)
*A01K 1/00* (2006.01)
(Continued)

(52) U.S. Cl.
CPC .......... *A01K 31/007* (2013.01); *A01K 1/0035* (2013.01); *A01K 1/015* (2013.01);
(Continued)

(58) Field of Classification Search
CPC .... A01K 31/007; A01K 1/0035; A01K 1/015; A01K 1/0236; A01K 31/18; A01K 2227/108; A01K 2227/30
See application file for complete search history.

(56) References Cited

U.S. PATENT DOCUMENTS 33,605 A * 10/1861 Robinson ............. A01K 1/0035
119/410
3,469,822 A 9/1969 O'Brien
(Continued)

FOREIGN PATENT DOCUMENTS

CN 111820139 A * 10/2020
CN 112219729 A * 1/2021
(Continued)

OTHER PUBLICATIONS

International Search Report and Written Opinion in PCT/US2020/050265, dated Feb. 12, 2021.
(Continued)

*Primary Examiner* — Monica L Perry
*Assistant Examiner* — Aaron M Rodziwicz

(57) ABSTRACT

An at least partially floorless semirigid poultry enclosure configured to flex and/or adjust to accommodate undulating terrain during movement across a field. The semirigid poultry enclosure may comprise a semirigid foundation. The semirigid foundation may include one or more flexible joints disposed between two or more rigid structural elements. The semirigid poultry enclosure may include multiple wall barriers coupled to the semirigid foundation. The semirigid poultry enclosure may include a roof barrier coupled to one or more of the multiple wall barriers and/or the semirigid foundation. Multiple wheels may be coupled to the semirigid foundation to facilitate movement of the semirigid poultry enclosure, wherein poultry within the semirigid poultry enclosure have access to the field from within the enclosure.

10 Claims, 4 Drawing Sheets

(51) Int. Cl.
   *A01K 1/015*     (2006.01)
   *A01K 31/18*    (2006.01)
   *A01K 1/02*      (2006.01)

(52) U.S. Cl.
   CPC ............ *A01K 31/18* (2013.01); *A01K 1/0236* (2013.01); *A01K 2227/108* (2013.01); *A01K 2227/30* (2013.01)

(56) References Cited

U.S. PATENT DOCUMENTS

| | | | |
|---|---|---|---|
| 4,048,959 | A | 9/1977 | Steele et al. |
| 4,924,813 | A | 5/1990 | Bixler et al. |
| 2020/0137986 | A1* | 5/2020 | Padour, II ............ A01K 1/0035 |
| 2020/0187449 | A1* | 6/2020 | Hallstrom ............ A01K 1/0035 |
| 2020/0260695 | A1* | 8/2020 | Rosales ................. A01K 31/16 |
| 2020/0267943 | A1* | 8/2020 | Padour, II ............ A01K 1/0035 |
| 2020/0305386 | A1* | 10/2020 | Niemela ............... A01K 1/0035 |
| 2021/0212293 | A1* | 7/2021 | Lhamon ................... G01L 1/16 |

FOREIGN PATENT DOCUMENTS

| | | | | |
|---|---|---|---|---|
| DE | 202019103934 U1 * | 8/2019 | ........... | A01K 1/0035 |
| WO | 200059296 A1 | 10/2000 | | |
| WO | WO-2008088379 A2 * | 7/2008 | ............ | B08B 15/02 |

OTHER PUBLICATIONS

International Preliminary Report on Patentability in PCT/US2020/050265, dated Mar. 15, 2022.

\* cited by examiner

SEMIRIGID POULTRY AND/OR SWINE ENCLOSURE

CROSS-REFERENCE TO RELATED APPLICATIONS

The present application claims priority to U.S. Provisional Patent Application No. 62/898,512, filed Sep. 10, 2019, the contents of which are incorporated herein in its entirety.

FIELD

The disclosure relates to a semirigid poultry and/or swine enclosure.

BACKGROUND

Conventional poultry and/or swine production uses stationary facilities. Due to their stationary nature, poultry and/or swine in conventional systems often live in dirty litter and/or fecal matter. As such, conventional poultry require vaccines, antibiotics and/or other drugs, and/or increased management practices to keep animals healthy. Stationary systems also require litter, bedding, and/or waste disposal/removal which leads to high materials costs, elevated labor costs, and environmental concerns. Furthermore, poultry and/or swine that are treated with vaccines, drugs, and antibiotics, and may subsequently lead to negative health effects on humans that consume their meat and eggs.

Existing methods of pasture raising poultry and/or swine are expensive for both farmers and consumers and thus are typically limited to small scale production. The amount of land and labor required to manage a large quantity of grazing poultry and/or swine has typically prevented pasture raised poultry and/or swine from being scalable for commercial poultry and/or swine farmers.

SUMMARY

One aspect of the disclosure relates to a semirigid poultry and/or swine enclosure. The semirigid poultry and/or swine enclosure may be moved and/or may move across a field to provide access to fresh pasture and bedding daily, eliminating the need for litter disposal, bedding, and vaccines, drugs, or antibiotics and allowing them to graze on pasture, grass, insects, worms, seeds, weeds, and flowers. As the semirigid poultry and/or swine enclosure moves across a field with an undulating landscape, it may flex and/or adjust to accommodate the terrain and prevent the escape of the poultry and/or swine.

One aspect of the semirigid poultry and/or swine enclosure may include a semirigid foundation. The semirigid foundation may comprise one or more flexible joints between rigid structural elements. The flexible joints may allow movement between the rigid structural elements. As such, the foundation may be semirigid and semiflexible. As the poultry and/or swine enclosure moves over uneven terrain, the flexible joints may enable portions of the semirigid foundation to flex while the rigid structural elements provide a solid foundation for a poultry and/or swine enclosure. The flexible joints may be links and/or linkages that enable flexion between the one or more rigid structural elements.

One aspect of the semirigid poultry and/or swine enclosure may include a semirigid frame. The semirigid frame may comprise one or more flexible joints between rigid structural elements. The flexible joints may allow movement between the rigid structural elements. As such, the frame of the poultry and/or swine enclosure may be semirigid and semiflexible. As the poultry and/or swine enclosure moves over uneven terrain, the flexible joints enable portions of the semirigid frame to flex while the rigid structural elements provide a solid frame for a poultry and/or swine enclosure.

The rigid structural elements of the semirigid foundation and/or semirigid frame may comprise piping (e.g., steel piping), framing (e.g., metal framing components), beams, wood beams, rubber, fiberglass, plastic, steel, aluminum, epoxy, composite materials, and/or other materials. A semirigid frame and/or foundation may be made of multiple rigid structural elements. Some or all of the rigid structural elements may be coupled together via flexible joints.

The flexible joints may include one or more of a pivot point joint, a universal joint ("U-joint"), a hinge joint, a prismatic joint, a ball joint, a revolute joint, a hooke joint, and/or any other joint that would facilitate movement between the rigid structural elements. The flexible joints may facilitate horizontal, vertical, lateral, and/or any other directional movement. In some implementations, the flexible joints may comprise a flexible material such that the rigid structural elements are coupled together via a flexible material.

In some implementations, the semirigid foundation may include a chassis such that the poultry and/or swine enclosure is mobile. The chassis may include rigid structural elements and/or flexible joints. The rigid structural element(s) of the chassis may include a drive shaft. The drive shaft may have one or more flexible joints.

In some implementations, the poultry and/or swine enclosure may comprise multiple wall barriers. The wall barriers may at least partially form the enclosure and/or contain the poultry and/or swine within the enclosure. The wall barriers may be coupled to the semirigid foundation and/or frame. In some implementations, the wall barriers may be resiliently flexible. By way of non-limiting example, the wall barriers may be made of one or more of and/or a combination of fences, walls, netting, wood, paneling, mesh, wire, cloth, metal sheeting, shingles, tarpaper, windows, canvas, plastic, tarp, rubber, and/or other materials. In some implementations, one or more wall barriers (e.g., outer walls) may consist of chicken wire or a comparable predator-deterring barrier that doesn't prevent fresh air and sunlight from entering. In some implementations, for example, one or more portions of the wall barriers may include canvas, plastic, panels, windows, louvers, and/or another material that rolls up/down for temperature regulation (the deployment of which may automated, including thermostatic regulation). In some implementations, the one or more wall barriers may have multiple layers with one or more (e.g., multiple) slits along its length in order to conform to the contours of the field and/or close any gaps through which the animals could escape.

In some implementations, the wall barriers may be rigid. The rigid wall barriers may be coupled together via flexible wall connectors. The flexible wall connectors may connect the rigid wall barriers and allow some flexibility between barriers. By way of non-limiting example, the flexible wall connectors may comprise a flexible material disposed between two or more rigid wall barriers, a sliding channel or groove that enables the rigid wall barriers to slide such that one wall barrier may slide up/down to accommodate a dip in the field while the other wall barrier remains at the same height or slides up/down to a different level), one or more hinges disposed between two or more rigid wall barriers, suspension systems such as a leaf spring, strut and piston, hydraulic systems, and/or other flexible wall connectors.

In some implementations, the walls may move naturally as the poultry coop moves over the field. In some implementations, the walls may be automated and/or manual (e.g., via electrical, gas powered, solar, air pressure, water pressure and/or other means).

This way somewhere in the future we may want to have manual or automated adjustments on the walls/joints for certain situations that we haven't foreseen yet.

The poultry and/or swine enclosure may be floorless. As such, the poultry and/or swine contained in the enclosure may be able to graze on a portion of the field. In some implementations, the enclosure may include a chassis with wheels, tracks, skids, and/or rail that facilitates movement of the enclosure. By way of example, there may be a clearance between one or more wall barriers and the field such that at least a portion of the enclosure may pass over deceased poultry and/or swine lying in the field. In some implementations, a lower portion of at least one of the wall barriers may be resiliently flexible. In some implementations, one or more sides of the barriers may be resiliently flexible.

These and other objects, features, and characteristics of the disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. As used in the specification and in the claims, the distinctions "first", "second", and/or "third" are used for clarity and distinction purposes and do not indicate order unless the context clearly dictates otherwise.

DETAILED DESCRIPTION

Figure 1:
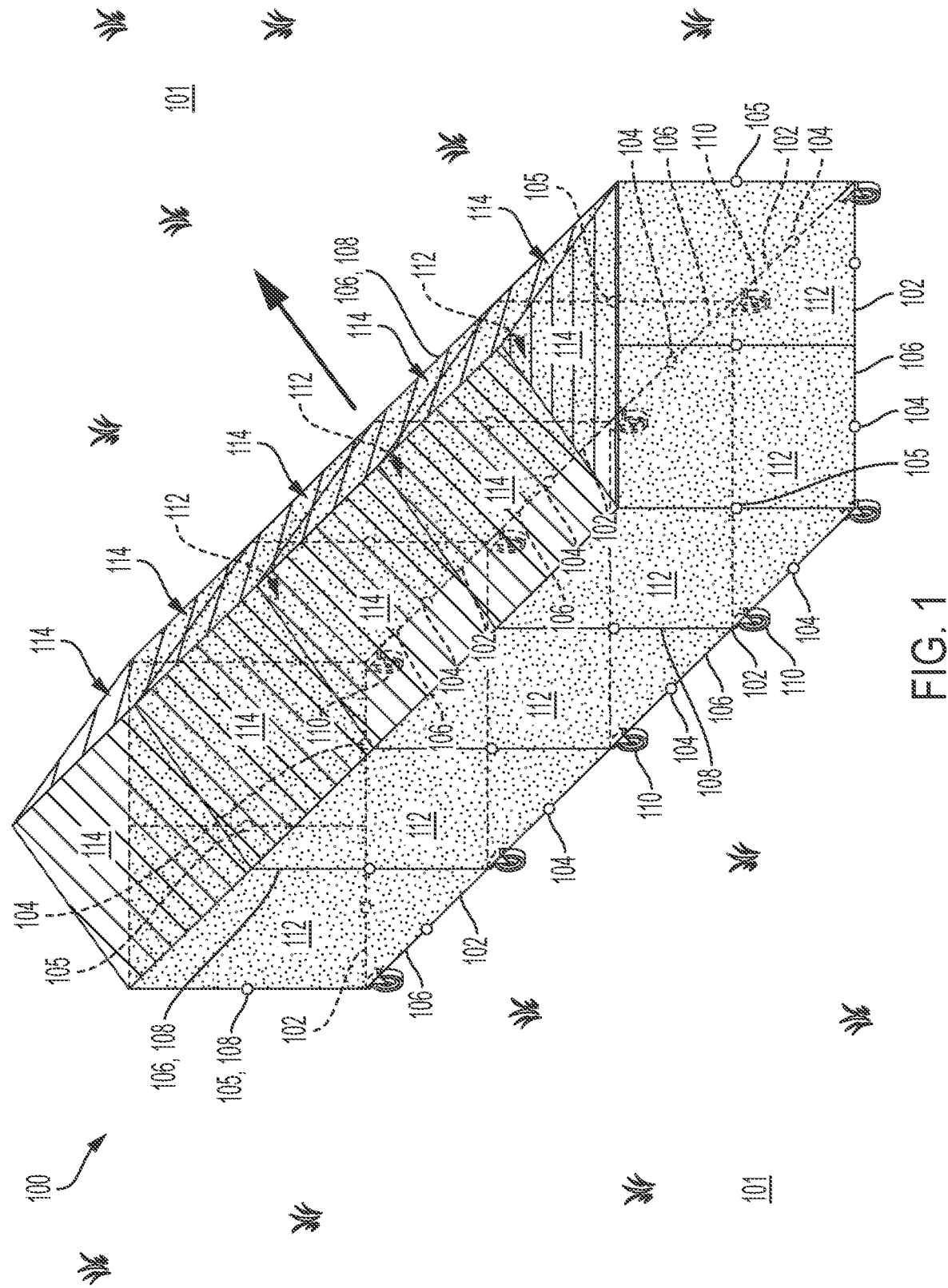
FIG. 1 illustrates a semirigid poultry and/or swine enclosure, in accordance with one or more implementations.

FIG. 1 illustrates a semirigid poultry and/or swine enclosure, in accordance with one or more implementations. Semirigid poultry and/or swine enclosure 100 may be moved and/or may move across a field 101. As semirigid poultry and/or swine enclosure 100 moves across a field with an undulating landscape, it may flex and/or adjust to accommodate the terrain and prevent the escape of the poultry and/or swine.

Semirigid poultry and/or swine enclosure 100 may include a semirigid foundation 102. Semirigid foundation 102 may comprise one or more flexible joints 104 disposed between and/or connecting rigid structural elements 106. Flexible joints 104 may allow movement between rigid structural elements 106. As such, semirigid foundation 102 may accommodate undulating terrain without allowing poultry and/or swine inside poultry and/or swine enclosure 102 to escape.

In some implementations, semirigid poultry and/or swine enclosure 100 may include a semirigid frame 108. Semirigid frame 108 may be coupled to and/or built upon semirigid foundation 102. Semirigid frame 108 may comprise one or more flexible joints 104 between rigid structural elements 106. In some implementations, flexible joints 104 included in semirigid foundation 102 may be the same and/or different as flexible joints 104 included in semirigid frame 108. Rigid structural elements 106 included in semirigid foundation 102 may be the same and/or different as rigid structural elements 106 included in semirigid frame. Semirigid frame 106 may be made from the same material as semirigid foundation 102. In some implementations semirigid frame 106 may be made from a different material than semirigid foundation 102.

Flexible joints 104 may allow movement between rigid structural elements 104 in the semirigid foundation 102 and/or the semirigid frame 108. As such, the frame of the poultry and/or swine enclosure may be semirigid and/or semiflexible. Poultry and/or swine enclosure 100 moves over uneven terrain, flexible joints 104 enable portions of the semirigid frame 108 to flex while the rigid structural elements 104 provide a solid frame for poultry and/or swine enclosure 100. (It is worth noting that not every single flexible joint 104, rigid structural element 106, portion of semirigid structural frame 108, portion of semirigid foundation 102, wheel 110, etc. depicted in FIG. 1 include a reference numeral. Also, while all flexible joints 104, rigid structural elements 106, semirigid structural frame 108, and semirigid foundation 102, wheels 110, etc. are depicted in the same manner in FIG. 1, they may not all be the same and/or they may be different.)

Rigid structural elements 106 may be made of piping (e.g., steel piping), framing (e.g., metal framing components), beams, wood beams, rubber, fiberglass, plastic, steel, aluminum, epoxy, composite materials, and/or other materials. Semirigid frame 108 and/or semirigid foundation 102 may be made of multiple rigid structural elements 106. In some implementations, only some of the rigid structural elements 106 may be coupled together via flexible joints 104 (as illustrated in FIG. 1). In some implementations all of the rigid structural elements 106 may be coupled together via one or more types of flexible joints 104.

Figure 2:
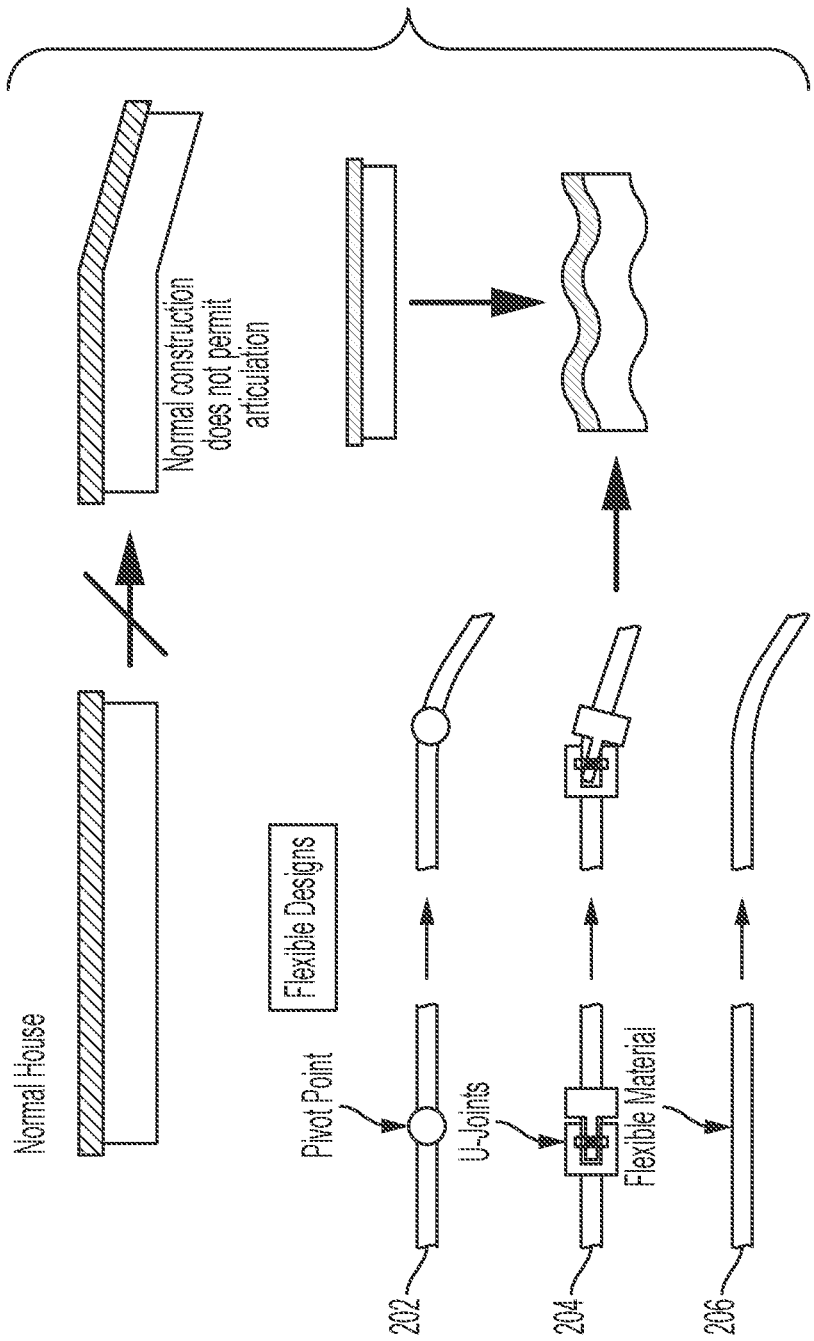
FIG. 2 illustrates some example flexible joints, in accordance with one or more implementations.

FIG. 2 illustrates some example flexible joints, in accordance with one or more implementations. The flexible joints may include one or more of a pivot point joint 202, a universal joint ("U-joint") 204, a hinge joint, a prismatic joint, a ball joint, a revolute joint, a hooke joint, and/or any other joint that would facilitate movement between the rigid structural elements. The flexible joints may facilitate horizontal, vertical, lateral, and/or any other directional movement. In some implementations, the flexible joints may comprise a flexible material 206 such that the rigid structural elements are coupled together via a flexible material.

Figure 3:
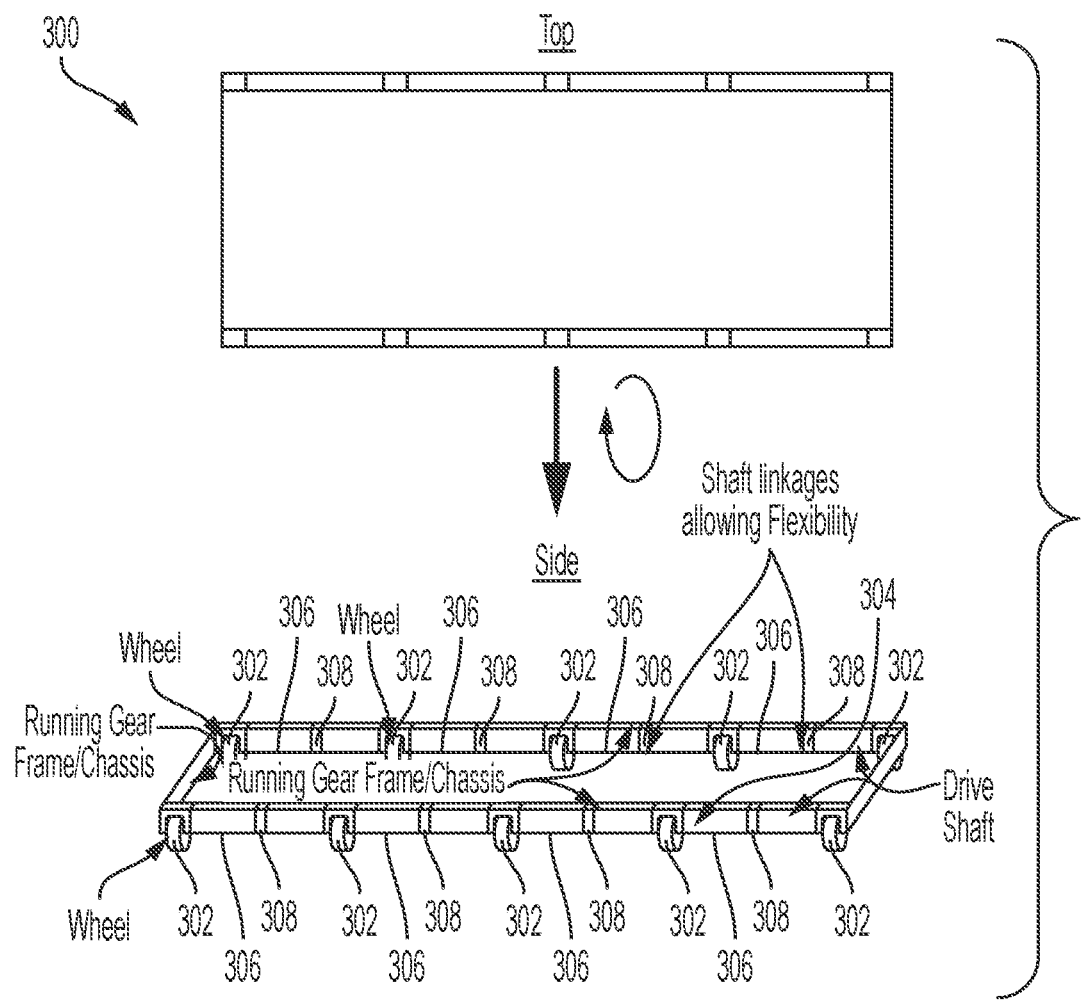
FIG. 3 illustrates an example semirigid foundation, in accordance with one or more implementations.

FIG. 3 illustrates an example semirigid foundation, in accordance with one or more implementations. Semirigid foundation 300 may include a chassis with one or more wheels 302 and/or a drive shaft 304. Wheels 302 and drive shaft 304 may enable poultry and/or swine enclosure to be mobile. The chassis may include rigid structural elements 306 and/or flexible joints 308 (the same as or similar to those in FIG. 1). In some implementations, the drive shaft 304 may have one or more flexible joints 308.

Figure 4:
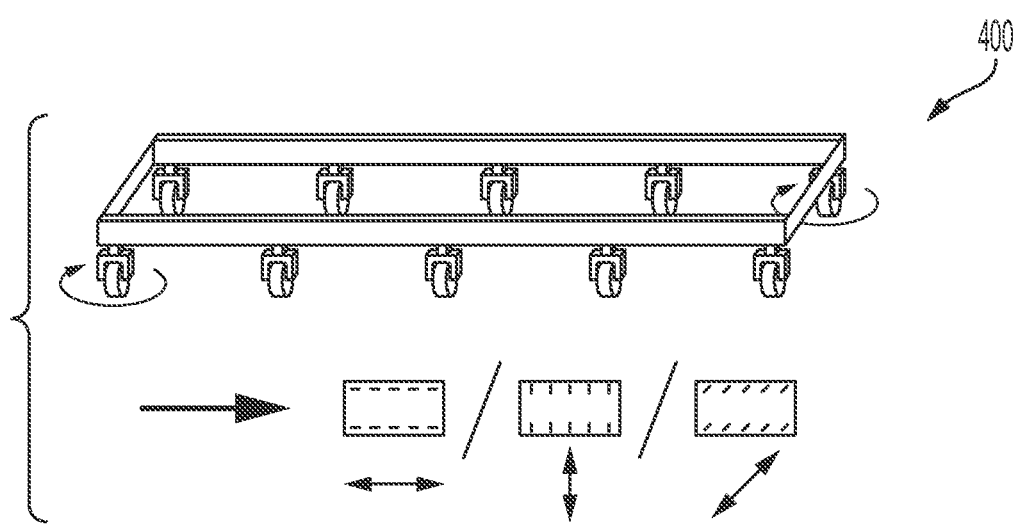
FIG. 4 illustrates a drive caster, in accordance with one or more implementations.

FIG. 4 illustrates a drive caster, in accordance with one or more implementations.

In some implementations, the chassis and/or semirigid foundation may include one or more drive casters 402. Drive casters 402 may comprise wheels having independent drive and/or rotation. By way of non-limiting example, drive casters 402 may comprise an independently motorized wheel apparatus.

Returning to FIG. 1, poultry and/or swine enclosure 100 may comprise multiple wall barriers 112 and/or roof barriers 114. Wall barriers 112 and/or roof barriers 114 may at least partially form the enclosure and/or contain the poultry and/or swine within the enclosure. Wall barriers 112 and/or roof barriers 114 may be coupled to semirigid foundation 102 and/or semirigid frame 108. In some implementations, wall barriers 112 and/or roof barriers 114 may be resiliently flexible. By way of non-limiting example, wall barriers 112 and/or roof barriers 114 may be made of one or more of and/or a combination of fences, walls, netting, wood, paneling, mesh, wire, cloth, metal sheeting, shingles, tarpaper, windows, canvas, plastic, tarp, rubber, and/or other materials. In some implementations, one or more wall barriers 112 (e.g., outer walls) may consist of chicken wire or a comparable predator-deterring barrier that doesn't prevent fresh air and sunlight from entering. In some implementations, for example, one or more portions of wall barriers 112 may include canvas, plastic, and/or another material that rolls up/down for temperature regulation (the deployment of which may automated, including thermostatic regulation). In some implementations, the one or more wall barriers 112 may have multiple layers with one or more (e.g., multiple) slits along its length in order to conform to the contours of the field and/or close any gaps through which the animals could escape.

In some implementations, wall barriers 112 and/or roof barriers 114 may be rigid. The rigid wall barriers 112 and/or roof barriers 114 may be coupled together via flexible wall connectors 105. Flexible wall connectors 105 may connect rigid wall barriers 112 and allow some flexibility between wall barriers 112. By way of non-limiting example, the flexible wall connectors 105 may comprise a flexible material disposed between two or more rigid wall barriers 112, a sliding channel or groove that enables the rigid wall barriers 112 to slide such that one wall barrier may slide up/down to accommodate a dip in the field while the other wall barrier remains at the same height or slides up/down to a different level), one or more hinges disposed between two or more rigid wall barriers 112, and/or other flexible wall connectors. (In FIG. 1, the flexible wall connectors 105 may appear to be located at individual points between wall barriers 112, however, it is contemplated that such flexible wall connectors run the entire junction between wall barriers 112 and/or a portion of the junction between wall barriers 112).

Poultry and/or swine enclosure 100 may be floorless. As such, the poultry and/or swine contained in the enclosure may be able to graze on a portion of the field. In some implementations, the enclosure may include a chassis with wheels 110. In some implementations, the field 101 may include tracks, skids, and/or rail that facilitates movement of the enclosure. By way of example, there may be a clearance between one or more wall barriers 112 and the field 101 such that at least a portion of poultry and/or swine enclosure 100 may pass over deceased poultry and/or swine lying in the field 101. In some implementations, a lower portion of at least one of the wall barriers 112 may be resiliently flexible (e.g., the lower portion of the wall barrier opposite the direction of movement of poultry and/or swine enclosure 100.)

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An at least partially floorless semirigid poultry enclosure configured to flex and/or adjust to accommodate undulating terrain during movement across a field, the semirigid poultry enclosure comprising:
    a semirigid foundation including one or more flexible joints disposed between two or more rigid structural elements, the semirigid foundation including a chassis having one or more flexible joints connecting two or more rigid structural elements forming at least part of the chassis, wherein the one or more flexible joints enable the two or more rigid structural elements forming at least part of the chassis to move in at least two opposing directions to enable the chassis and the semirigid foundation to accommodate the undulating terrain;
    multiple wall barriers coupled to the semirigid foundation;
    a roof barrier coupled to one or more of the multiple wall barriers and/or the semirigid foundation, such that the semirigid foundation, multiple wall barriers, and the roof barrier form the floorless semirigid poultry enclosure;
    multiple wheels coupled to the semirigid foundation to facilitate movement of the semirigid poultry enclosure, wherein poultry within the semirigid poultry enclosure have access to the field from within the enclosure.

2. The semirigid poultry enclosure of claim 1, wherein the multiple wheels are independently motorized.

3. The semirigid poultry enclosure of claim 1, further comprising a semirigid frame coupled to the semirigid foundation, wherein the one or more of the multiple wall barriers are coupled to the semirigid frame.

4. The semirigid poultry enclosure of claim 3, wherein the one or more wall barriers have multiple layers with one or more slits along a length in order to conform to the contours of the field and/or close any gaps through which the animals could escape.

5. The semirigid poultry enclosure of claim 3, wherein the one or more wall barriers are rigid and coupled together via flexible wall connectors that allow at least partial flexibility between the one or more wall barriers.

6. The semirigid poultry enclosure of claim 1, wherein the flexible joints include one or more of a pivot point joint, a universal joint ("U-joint"), a hinge joint, a prismatic joint, a ball joint, a revolute joint, a hooke joint, and/or any other joint that would facilitate movement between the rigid structural elements.

7. The semirigid poultry enclosure of claim 1, wherein the flexible joints comprise a flexible material such that the rigid structural elements are coupled together via a flexible material.

8. The semirigid poultry enclosure of claim 1, wherein multiple wheels comprise one or more drive casters having independent drive and/or rotation such that the drive casters are independently motorized wheels.

9. The semirigid poultry enclosure of claim 1, wherein the rigid structural elements comprise one or more of metal piping, metal framing, metal beams, wood beams, rubber, fiberglass, plastic, steel, aluminum, epoxy, and/or a composite material.

10. The semirigid poultry enclosure of claim 1, wherein the wall barriers comprise one or more of and/or a combination of fences, walls, netting, wood, paneling, mesh, wire, cloth, metal sheeting, shingles, tarpaper, windows, canvas, plastic, tarp, and/or rubber.

* * * * *